US009582595B2

(12) United States Patent
Trifa et al.

(10) Patent No.: US 9,582,595 B2
(45) Date of Patent: Feb. 28, 2017

(54) COMPUTER-IMPLEMENTED OBJECT INFORMATION SERVICE AND COMPUTER-IMPLEMENTED METHOD FOR OBTAINING INFORMATION ABOUT OBJECTS FROM SAME

(71) Applicant: EVRYTHNG Limited, London (GB)

(72) Inventors: Vlad Trifa, London (GB); Dominique Guinard, London (GB); Niall Murphy, Commugny (CH)

(73) Assignee: EVRYTHNG Limited, London (GB)

( * ) Notice: Subject to any disclaimer, the term of this patent is extended or adjusted under 35 U.S.C. 154(b) by 0 days.

(21) Appl. No.: 14/457,076

(22) Filed: Aug. 11, 2014

(65) Prior Publication Data

US 2015/0083798 A1    Mar. 26, 2015

Related U.S. Application Data

(60) Provisional application No. 61/882,814, filed on Sep. 26, 2013.

(51) Int. Cl.
*G06F 17/30*    (2006.01)

(52) U.S. Cl.
CPC .............................. *G06F 17/30879* (2013.01)

(58) Field of Classification Search
CPC ................................................ G06F 17/30879
USPC ......................................................... 235/375
See application file for complete search history.

(56) References Cited

U.S. PATENT DOCUMENTS

| | | | |
|---|---|---|---|
| 6,005,482 A * | 12/1999 | Moran | ............. G06F 17/30017 235/375 |
| 8,401,914 B1 | 3/2013 | Kim | |
| 8,484,363 B2 | 7/2013 | Brown | |
| 9,027,108 B2 | 5/2015 | Tan | |
| 9,071,967 B1 | 6/2015 | Davies | |
| 2005/0021458 A1 | 1/2005 | Rowe | |
| 2010/0080383 A1 | 4/2010 | Vaughan | |
| 2010/0274725 A1 | 10/2010 | Holbery | |
| 2011/0314539 A1 | 12/2011 | Horton | |
| 2012/0096277 A1 | 4/2012 | Perez Soria | |

(Continued)

OTHER PUBLICATIONS

Kim, Eunice, Jhih-Syuan Lin, and Yongjun Sung. "To app or not to app: Engaging consumers via branded mobile apps." Journal of Interactive Advertising 13.1 (2013): 53-65.

(Continued)

*Primary Examiner* — Toan Ly
(74) *Attorney, Agent, or Firm* — Siritzky Law, PLLC

(57) ABSTRACT

A computer-implemented method includes obtaining information about an object at a device; providing at least some of the information to an identification mechanism; obtaining an identifier for the object from the identification service; and using the identifier to access and store information about the object at an information mechanism. The information about the object may be determined from at least one image of the object. The information mechanism may include at least one object information application, and the information mechanism may have an Application Program Interface (API) to the at least one object information application, wherein the device uses the identifier to access the at least one object information application via the API. The identifier may be a Uniform Resource Identifier (URI) that is resolvable to the information mechanism.

26 Claims, 6 Drawing Sheets

(56) References Cited

U.S. PATENT DOCUMENTS

| | | |
|---|---|---|
| 2012/0160912 A1 | 6/2012 | Laracey |
| 2012/0267430 A1* | 10/2012 | Penny ............... H04M 3/42008 235/375 |
| 2013/0006742 A1 | 1/2013 | Richard |
| 2013/0019284 A1 | 1/2013 | Pacyga |
| 2013/0048707 A1* | 2/2013 | Do ....................... G01C 21/005 235/375 |
| 2013/0059534 A1 | 3/2013 | Sobalvarro |
| 2013/0087608 A1 | 4/2013 | Addy |
| 2013/0103847 A1 | 4/2013 | Brown |
| 2013/0239104 A1 | 9/2013 | Savant |
| 2013/0254262 A1 | 9/2013 | Udall |
| 2013/0284804 A1* | 10/2013 | Saywa .................... G06F 17/30 235/380 |
| 2013/0290203 A1 | 10/2013 | Purves |
| 2014/0002236 A1 | 1/2014 | Pineau |
| 2014/0028435 A1 | 1/2014 | Brockway, III |
| 2014/0070001 A1 | 3/2014 | Sanchez |
| 2014/0358683 A1 | 12/2014 | Panicali |
| 2015/0235190 A1 | 8/2015 | Urban |

OTHER PUBLICATIONS

USPTO, Non-Final Office Action mailed Nov. 4, 2015 in U.S. Appl. No. 14/457,103 [13 pages, including 2 page Form 892].

\* cited by examiner

COMPUTER-IMPLEMENTED OBJECT INFORMATION SERVICE AND COMPUTER-IMPLEMENTED METHOD FOR OBTAINING INFORMATION ABOUT OBJECTS FROM SAME

RELATED APPLICATIONS

This application claims the benefit of U.S. Provisional Application No. 61/882,814, filed Sep. 26, 2013, titled "IDENTIFICATION OF OBJECTS," the entire contents of which are hereby fully incorporated herein by reference for all purposes.

INCORPORATION BY REFERENCE

This application is related to U.S. provisional patent application 61/745,638, titled "A System, Method and a Tag for Mapping Tagged Objects to Context-Aware Applications," filed Dec. 23, 2012, the entire contents of which are fully incorporated herein by reference for all purposes.

BACKGROUND OF THE INVENTION

Copyright Statement

This patent document contains material subject to copyright protection. The copyright owner has no objection to the reproduction of this patent document or any related materials in the files of the United States Patent and Trademark Office, but otherwise reserves all copyrights whatsoever.

FIELD OF THE INVENTION

This invention relates to identification of objects. More specifically, this invention relates to using a client application to access an online identity associated with an individual product.

GLOSSARY AND ABBREVIATIONS

As used herein, unless used otherwise, the following terms or abbreviations have the following meanings:
API means Application Program(ing) Interface;
DNS means Domain Name System;
EAN means European Article Number;
FQDN means Fully Qualified Domain Name;
GTIN means Global Trade Item Number;
HTTP means Hyper Text Transfer Protocol;
HTTPS means HTTP Secure;
JAN means Japanese Article Number;
"QR code" means Quick Response Code ("QR code" is a trademark for a type of matrix barcode or two-dimensional barcode);
RFID means radio frequency identification;
SKU means stock-keeping unit
UPC means Universal Product Code;
URI means Uniform Resource Identifier;
URL means Uniform Resource Locator;
UTC means coordinated universal time.

BRIEF DESCRIPTION OF THE DRAWINGS

Various other objects, features and attendant advantages of the present invention will become fully appreciated as the same becomes better understood when considered in conjunction with the accompanying drawings, in which like reference characters designate the same or similar parts throughout the several views, and wherein.

DETAILED DESCRIPTION OF THE PRESENTLY PREFERRED EXEMPLARY EMBODIMENTS

System Overview

Figure 1A:
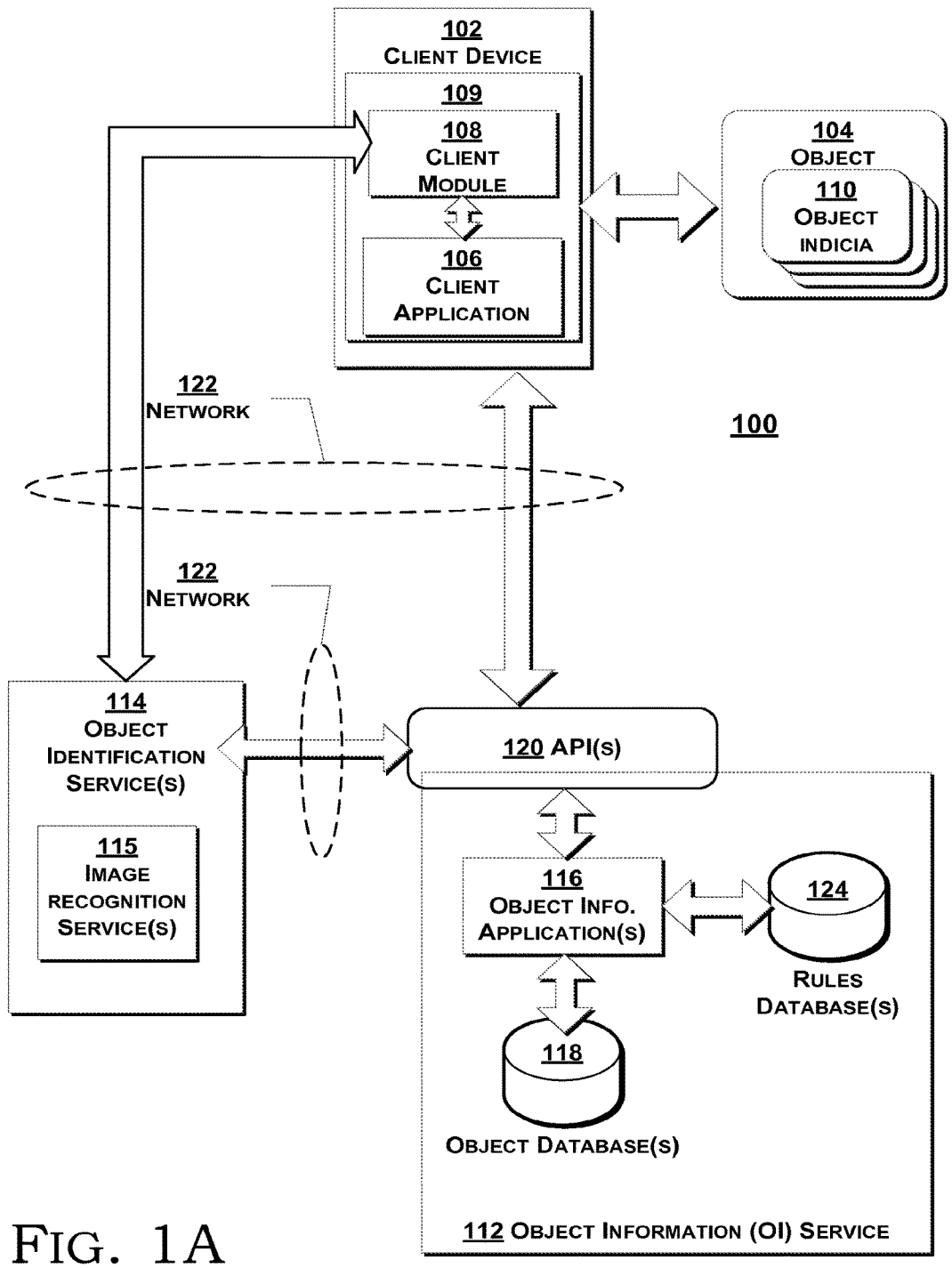
FIGS. 1A-1B provide an overview of systems/frameworks according to embodiments hereof.

FIG. 1A provides an overview of a system/framework 100 according to embodiments hereof. Within the framework 100, each of multiple users or clients may have one or more client devices 102 associated therewith. For the purposes of this description only a single client device 102 is shown in the drawing. A client device 102 may be any computing device, e.g., a smartphone (such as an iPhone or android phone or the like), a tablet computer, or similar device. As described in greater detail below, each client device 102 includes at least one mechanism supporting interaction between the device 102 and an object 104, enabling the client device 102 to obtain or determine or ascertain information about the object. The interaction mechanism may include one or more sensors, e.g., one or more cameras and/or scanning devices or the like, allowing the device obtain one or more images of or other information associated with the object 104.

As used herein, an "object" may be any item or entity, including, without limitation, a physical and/or material and/or or immaterial item, a virtual item, a location, an event, a thing, a person, a place, an image, a sound, etc.

As used herein, the term "mechanism" refers to any device(s), process(es), service(s), or combination thereof. A mechanism may be implemented in hardware, software (e.g., as a software module), firmware, using a special-purpose device, or any combination thereof. A mechanism may be integrated into a single device or it may be distributed over multiple devices. The various components of a mechanism may be co-located or distributed. The mechanism may be formed from other mechanisms. In general, as used herein, the term "mechanism" may be considered to be shorthand for the term device(s) and/or process(es) and/or service(s).

A client device 102 may be running multiple applications, e.g., applications related to the functionality of the device. For example, if the device is a phone, the device may be running multiple applications relating to its functionality as a phone. At least one client application 106 (i.e., an application running on client device 102) may interface with or be integrated with a client module 108 providing functionality according to embodiments hereof.

The client application 106 may interact and interface with the client module 108 in any known manner in order for the client module to provide information to or obtain information from the client application 106. It should be appreciated, however, that the system is not limited by the manner in which the client application 106 and the client module 108 interact or interface. For example, the client module 108 may be a plug-in associated with the client application 106, or the client module 108 may be a linked or dynamically linked library to which the client application 106 may link, or the client module may be provided as a separate application that the client application 106 may invoke.

In general, the client module 108 is a mechanism and thus may be implemented in hardware, software, firmware, using a special-purpose device, or any combination thereof. Those of ordinary skill in the art will appreciate and understand, upon reading this description, that the client module 108 may be provided in multiple parts or components that may interact with each other and or with the client application 106 in multiple ways.

In a presently preferred implementation, the client module 108 is a software module provided to the client application 106 in source or object code form and incorporated appropriately by the client application, e.g., at compile or link time. Thus, although shown logically in the drawings as two separate components, those of ordinary skill in the art will realize and appreciate, upon reading this description, that in a particular implementation the client application 106 and client module 108 may comprise a single application 109.

Upon request or invocation by the client application 106, the client module 108 provides functionality to invoke and/or control aspects of the client device 102 (e.g., to invoke and/or control sensor(s) such as camera(s) on the client device 102) in order, e.g., to obtain information about an object 104. In a presently preferred implementation the client module 108 uses one or more cameras on the client device 102 to obtain at least one image of an object 104. It should be appreciated that the client module 108 may, in addition to or instead of image data, obtain or determine other data associated with the object 104.

An object 104 may include object indicia 110 such as, for example, a numeric code (such as a serial number, SKU, UPC, JAN, EAN, GTIN, or the like), a one-dimensional barcode, a two-dimensional barcode (such as a QR code) or the like. A particular object 104 may include multiple object indicia 110. It should be appreciated that the system is not limited by the type or number (if any) of object indicia 110 on any particular object 104, or by the manner in which such indicia are incorporated in or associated with the object. For example, indicia may be printed on the object, printed on a tag or label or sticker associated with the object, etched into the object, engraved on the object, etc. Different indicia on the same object may be incorporated in or associated with that object in different ways. It should further be appreciated, as explained below, that some objects 104 may not include any indicia 110 (or at least not include any usable indicia).

Although the client module 108 is described herein as preferably using one or more cameras associated with a client device 102, it should be appreciated that other sensors may be used instead of or in addition to a camera. For example, if the client device has the ability to read RFID tags, the client module 108 may also (or instead) obtain object indicia using this ability.

The framework 100 also includes an object information service 112 that maintains information about objects and at least one object identification service 114 (both described in greater detail below).

The object information service 112 generates, maintains, uses, and hosts persistent and structured information profiles that describe and store information about individual objects known to the object information service 112. The object information service 112 may use object information application(s) 116 to perform some or all of its functionality, including generating, maintaining, accessing, using, and hosting the persistent and structured information profiles that describe and store information about individual objects.

The object information service 112 preferably maintains information about individual objects in one or more object databases 118. Each object 104 for which the object information service 112 maintains information has a unique object identifier associated therewith within the object information service 112, and information about each particular object within the object information service 112 is preferably keyed or indexed on the unique object identifier for that particular object. Thus, given a particular unique object identifier corresponding to a particular object, the object information service 112 may use that particular unique object identifier to operate on (e.g., use, access, etc.) that particular object.

The object identification service 114 may include or have access to one or more image recognition services 115.

As used herein, the term "access" means, without limitation, to read, write, copy, update, or use in any way, directly or indirectly.

Those of ordinary skill in the art will realize and appreciate, upon reading this description, that information within the object information service 112 may also be keyed or indexed on other information or keys.

The object database(s) 118 may use any known methods of storing and accessing object information, and the scope of the system is not limited by the manner in which information is stored or accessed in the object database(s) 118. At least some of the object database(s) 118 may be co-located with the object information service 112, however the object database(s) may be fully or partially located apart from the object information service 112.

Information in object database(s) 118 may be accessed by object information application(s) 116, e.g., through application programming interfaces (APIs) 120. The object information application(s) 116 preferably include one or more applications to support functions such as creation, storage, update, and access of object information object database(s) 118. Exemplary APIs are described in greater detail below.

Access to information in the object information service 112 preferably requires authorization by the object information service, and is preferably authorized for users who are required to be registered in some manner with the object information service 112.

In some exemplary implementations the object information service 112 may use one or more rules databases 124 in order to provide some or all of the functionality. Rules database(s) 124 may be used to support policy/rule-based interaction with the object information. The rules database(s) 124 may be updated.

In order to obtain the unique object identifier associated with a particular object (e.g., a physical object), a client application 106 may interact with an object identification service 114 via an associated client module 108. An object identification service 114 may thus be used to try to identify an object 104 and to provide the invoking client module 104 with a unique identifier for a particular object, based, e.g., on information about the particular object (e.g., processed image and processed image information) it receives from the client module 108. The client module 108 may then provide this unique object identifier to an associated client application 106.

The unique object identifier is preferably a URI (or included in a URI), and an object identification service 114 preferably provides the client module that invoked it with a URI associated with the object 104.

The syntax of URIs is defined in Network Working Group "Uniform Resource Identifier (URI): Generic Syntax," RFC 3986, STD 66, January, 2005, the entire contents of which are incorporated herein by reference for all purpose. For the purposes of this description, a URI representing or comprising a unique object identifier preferably has the form:

<scheme>://<domain>/<path>/<id>

Where <scheme> is "http" or preferably "https", <domain> is a domain name (preferably a FQDN) that resolves to the object information service 112; <path> is an optional field that represents a path on the object information service 112, and <id> is an identifier (or name) that is unique within the object information service 112.

By way of example, if the object information service 112 (or the APIs 120 associated with the object information service 112) may be accessed at the domain api.evrythng.om, and the <path> is "thugs" (described below with reference to an exemplary API), and a particular object has the unique identifier "504766a7c8f205a0744243c1" within the object information service 112, then the URI corresponding to that particular object may look like:

https://api.evrythng.com/thngs/504766a7c81205a0744243c1

The object information service 112 is preferably an online software web service accessed via network 122 (e.g., the Internet). The object information service 112 is preferably operated independently of client applications. An object identification service 114 is preferably an online web service, and a client module 108 may interact with the object identification service 114 via a network 122 (e.g., the Internet). Although shown in the drawings as using the same network 122, it should be appreciated that the client module need not access the object identification service 114 using the same network as is used to access the object information service 112.

The client application 106 and/or client module 108 may access the various services (object information service 112, object identification service 114) by any connection mechanism(s) or combinations thereof, including wired (e.g., WAN, LAN), wireless (e.g., WiFi), cellular, etc. The system is not limited by the manner or type of connection mechanism(s) used to access the various services.

An object identification service 114 may make use of third party services (not shown) to assist it in identifying the object type, e.g., via image processing or the decryption of a URI encoded in information it receives from a client module 108.

Figure 1B:
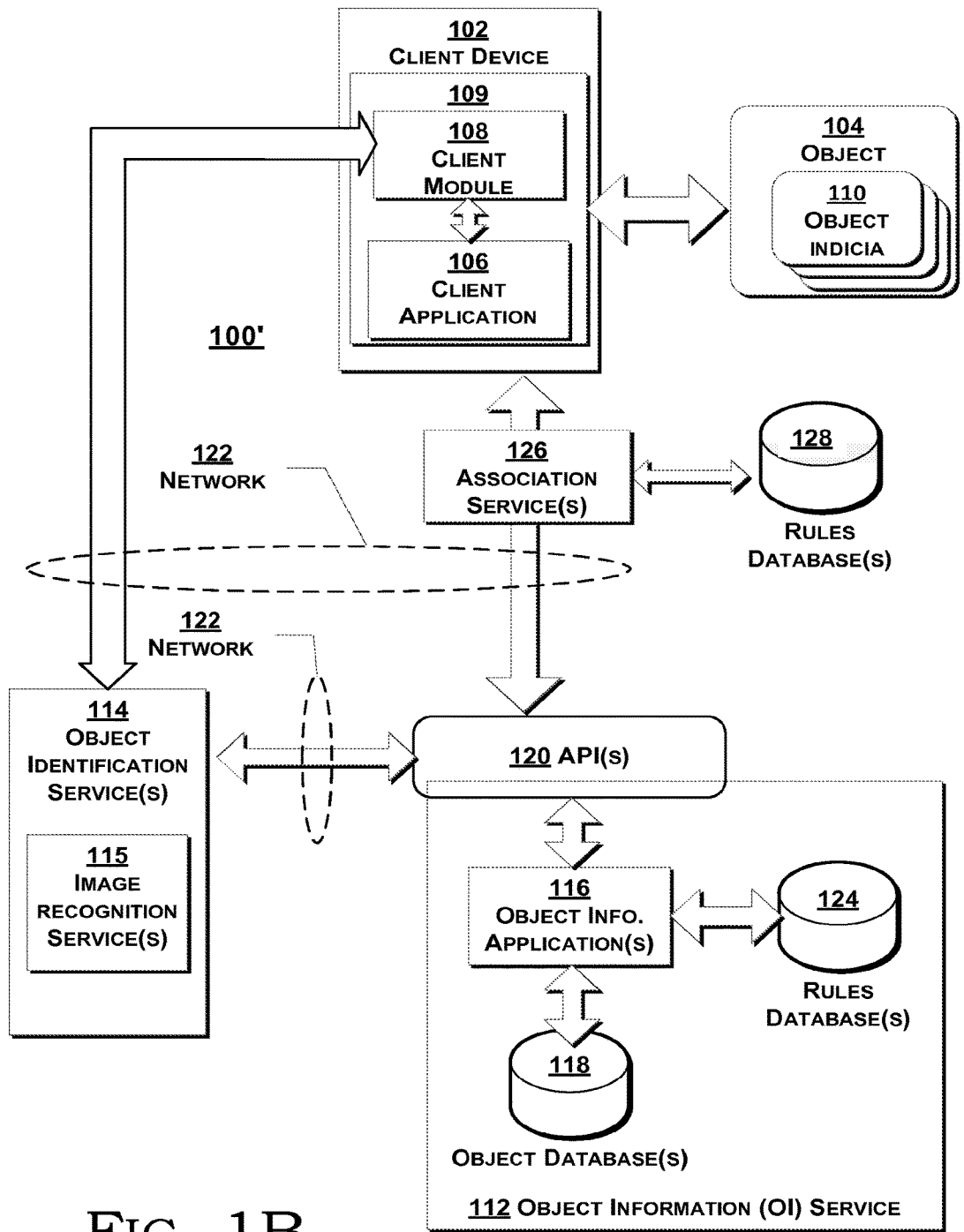

FIG. 1B provides an overview of an alternate system/framework 100' according to embodiments hereof. As can be seen in the drawing, the framework 100' includes association services 126 and corresponding rules databases 128. The association services 126 may be used to direct (or redirect) URI requests made by client application 106 to the object information service 112. In some embodiments the association services 126 may correspond to the context-aware redirect the server described in U.S. provisional patent application 61/745,638. In some embodiments, the association services 126 may be implemented, at least in part, using a rule-based domain name system (DNS).

Exemplary Data Structures & Organization

Figure 2A:
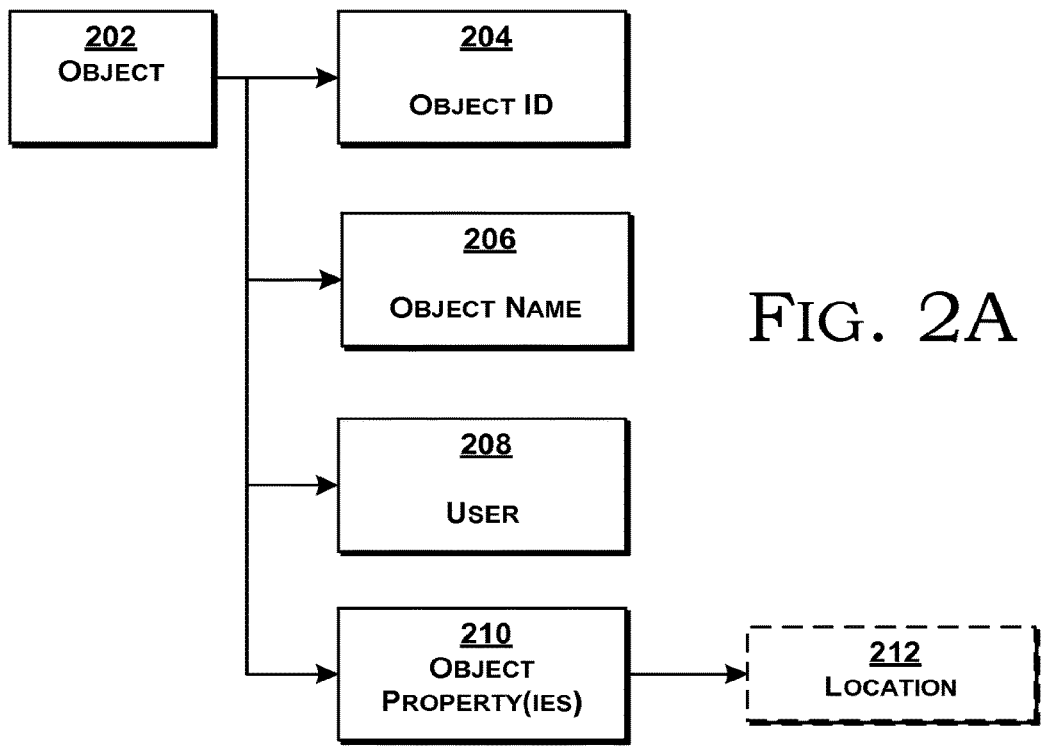
FIGS. 2A-2B show exemplary data structures and organization of data according to embodiments hereof.
Figure 2B:
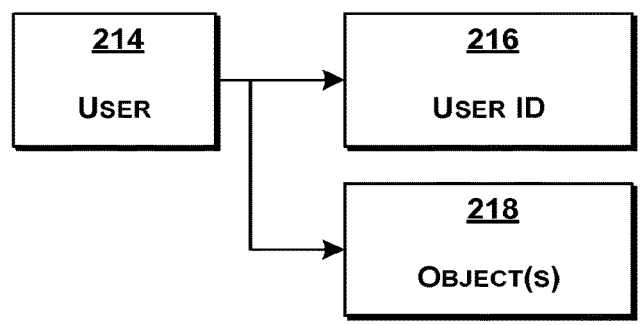

FIGS. 2A-2B show exemplary data structures and organization of data in the object database 118. Each object is preferably associated with a user, and, with reference to FIG. 2A, each object 202 has a unique identity 204, a name 206 (which may be a user assigned name), and an associated user 208. Each object 202 may also have one or more properties 210, which may include, e.g., a location property 212. In general, a property 210 will be one or more arbitrary <key, value> pairs.

With reference to FIG. 2B, each user 214 has a user identity (ID) 216. A user may also have one or more objects 218 (corresponding to object 202 in FIG. 2A) associated therewith.

Exemplary Object Information Service API

This section describes exemplary data structures, object information applications used by/in object information service 112, as well as a public API 120 to those applications.

The API 120 preferably follows the RESTful architectural principles, which means it tries to get the best out of HTTP and the Web. The API 120 may be used in a programming language or via any HTTP client that handles at least POST and GET.

Those of ordinary skill in the art will realize and appreciate, upon reading this description, that the applications, data structures, and API described here are given only by way of example, and any particular embodiment or implementation may use different and/or other applications, data structures, and APIs.

As can be seen in the following, the API allows users to access the functionality (e.g., the object information applications 116) of the object information service 112 using a domain associated with the object information service 112. In the case of a specific object, the domain is preferably specified in the URI comprising the unique object identifier for that specific object. Thus, as will be appreciated by those of ordinary skill in the art will realize and appreciate, upon reading this description, the URI comprising the unique object identifier for a specific object provides a way to access the object information service 112 with respect to that object.

API Overview

A central data structure in the exemplary object information service 112 is referred to as Thngs that are data containers to store all the data generated by and about any object. Various properties can be attached to any Thng, and the content of each property can be updated any time, while preserving the history of those changes. Thngs can be added to various Collections that support sharing a set of Thngs with other Users within the object information service.

Thng

A Thng is essentially an abstract notion of an object which may have property data (e.g., location data) associated with it. Also called Active Digital Identities (ADIs), these resources can model objects such as real-world elements (e.g., persons, places, cars, guitars, mobile phones, etc.). Every thng in the object information service 112 is assigned a unique identifier (ThngID) at creation time. The unique identifier is necessary to access/edit the thng.

An example basic (JSON) document schema of a Thng (as stored within object information service 112) is as follows:

```
<Thng>={
    "id": <String>,
    "createdAt": <timestamp>,
    "updatedAt": <timestamp>,
    "name": <String>,
    "description": <String>,
    "location": {
        "longitude": <Number>,
        "latitude": <Number>,
        "timestamp": <timestamp>
    },
    "product": <String>,
    "properties": {
        <String>: <String>,
        ... },
    "tags": [<String>, ...]
}
```

Property

A Thng may have various and arbitrary properties, preferably stored as arbitrary key/value pairs. The values may be updated individually at any time, and may be retrieved historically (e.g., "Give me the values of property X between 10 am and 5 pm on the 16 Aug. 2012").

Location

Each Thng preferably has a special type of Properties used to store snapshots of its geographic position over time (e.g., as GPS latitude and longitude coordinates).

User

Each interaction with the object information service 112 is preferably authenticated and a user is preferably associated with each action. This approach dictates security access.

Collection

A collection is a grouping of Thngs. Collections can be created by various users, and the same Thng may be in more than one collection.

HTTP Verbs

The exemplary API preferably uses appropriate HTTP verbs for each action, as described, e.g., in the following table:

| Verb | Meaning |
| --- | --- |
| GET | Used for retrieving resources such as Thngs, Collections, or Properties of a Thng. |
| POST | Used to create a new Thng, Collection, or to perform custom actions. |
| PUT | Used for updating Thngs, Collections, or Properties/Locations of a Thng. |
| DELETE | Used for deleting resources. A successful delete will always return a 200 OK response, even if no payload is attached. |

If no errors has occurred when processing a request, the user will preferably receive one of the reply codes, as described, e.g., in the following table

| Code | Meaning |
| --- | --- |
| 200 | OK - Used when things go right (e.g., update of a resource, retrieve a resource, etc.). Note: It can come with or without a body. |
| 201 | Created - Returned after creating a new resource (a thng, a collection, etc.), and the Location: will contain the URI of the resource. The response payload should contain the resources in the body, unless several resources were created in which case we just return an array of their IDs. |

HTTP Error Codes

When calling the API a user might get an error code, which the user must preferably handle within their application. Error codes may include the following:

| Code | Meaning |
| --- | --- |
| 400 | Bad Request |
| 401 | Unauthorized (The access credentials (via the Authorization header) were missing or are invalid.) |
| 403 | Forbidden (The credentials provided are valid, but not authorized to access the requested resource) |
| 404 | Not found (the request is valid, but the requested resource does not exist) |
| 415 | Unsupported Media Type (Returned when the requested form (e.g., XML) is not supported for this resource). |

Errors preferably also return a payload (e.g., a JSON payload) with error message(s) associated.

Authentication

Access to the API 120 is preferably via HTTPS requests to a domain associated with the object information service 112 (or with the API of the object information service 112), e.g., https://api.OIS.com. Unencrypted HTTP requests may be accepted, although the use of secure HTTP (HTTPS) is preferred in order to store any valuable data.

Every request to the API 120 preferably includes an API key using an Authorization HTTP header to identify the user or application issuing the request and execute it if authorized.

The following is an example request to the API 120 that returns a list of all of the Thngs the user has created (in the following examples https://api.OIS.com is used as a domain associated with the object information service 112):

GET "https://api.OIS.com/thngs"

Create a Single Thng

To create a Thng, POST a JSON document to the /thngs resource. For example:

```
POST "https://api.OIS.com/thngs" \
-d '{
"name": "Room-212-Santa-Maria-Novella",
"description": "Room 212 at the Santa-Maria Novella in Florence, Italy",
"location": {
"latitude": 43.772828,"longitude": 11.249488},
"properties":{
"pricePerNightEuros":"300",
"pricePerNightGBP":"200",
"RoomSize":"40sqm",
"Style":"Double Bed, 2pax"
},
"tags":["room","hotel","Florence","romance"]
}'
```

In response to this POST, the object information service creates an object (Thng) and assigns it a unique ID—the {ThngID}.

Get a Single Thng

To read the data from a thng, do a GET on the THNG URI (returned in the Location header when the thng was created)

GET /thngs/{ThngID}

Example Query:

GET "https://api.OIS.com/thngs/504766a7c81205a0744243c1"

Update a Thng

A user can update the data of a thng using any subset of a valid document model. The fields are entirely replaced by the new values, so to add a tag for example the user must submit the previous tag array with the new tags. For example:

```
PUT 'https://api.OIS.com/thngs/504766a7c8f205a0744243c1' \
-d '{
"name": "Room-213-Santa-Maria-Novella",
"description": "Room 213 at the Santa-Maria Novella in Florence, Italy"
}'
```

Deleting a Thng

To delete a thng, send a DELETE to the thng URI.

DELETE /thngs/{ThngID}

Example Query:

DELETE 'https://api.OIS.com/thngs/504766a7c81205a0744243c1'

Get the List of all Thngs

To retrieve the list of all the thngs you have created, do a GET on the /thngs resource.

GET /thngs

Example Query:

GET 'https://api.OIS.com/thngs'

Properties

Each ADI can have many properties (which may be arbitrary key/value pairs). Each property update is preferably time stamped and stored, therefore one can retrieve the set of all the values of a property during a specific time range. Properties may have the form:

```
<Properties>=[
{
    *"key": <String>,
    *"value": <String>,
    "timestamp": <timestamp>;
},
...
]
```

A Properties JSON document is an array of Objects that always contain a key, a value, and a timestamp. If the optional timestamp is not provided when updating the property, it is automatically set at the moment when the request has been processed.

Updating Properties

When an object is created, a user may specify an initial set of properties and their values. To update those properties or to add new ones subsequently, the user may use PUT on the /thngs/{ThngID}/properties endpoint, with a "Properties" JSON object. If the properties being updated do not exist, they are created automatically by this request and no error/notification is returned.

In a presently preferred implementation, in order to cope with the limitations of mobile network providers a user may use both POST or PUT to update properties, e.g.:

PUT /thngs/{ThngID}/properties

The returned payload is an array of the properties updated, not all the properties.

Example Query:

```
PUT
'https://api.OIS.com/thngs/504766a7c8f205a0744243c1/properties' \
-d '[{"key": "year","value": "1968"},{"key": "color","value": "red"}]'
```

Get the List of all Properties

A user may retrieve a list of all the properties of a thng using GET on the /thngs/{ThngID}/properties endpoint, e.g., GET /thngs/{ThngID}/properties The returned payload is the complete array of all the properties with the last value of each.

Example Query:

GET 'https://api.OIS.com/thngs/504766a7c81205a0744243c1/properties'

Get a Single Property

To retrieve the history of each property (their value over time), a user must access the unique endpoint for each property. By default, all the updates of this property are returned using pagination in a reverse history fashion (the first element of the returned array is the last update). An example document schema for a unique property is as follows:

```
<Property>=[
{
    *"value": <String>,
    "timestamp": <timestamp>
},
...
]
```

Note that in contrast to <Properties>, the <Property> object model does not have the "key" element as it is already contained in the URL of the resource. E.g., GET /thngs/{ThngID}/properties/{key} [?from=<timestamp>&to=<timestamp>]

For accessing only a subset of all the updates to a single property, A user can specify a time range the ?from=<timestamp> and ?to =<timestamp> to specify respectively the beginning and end of the time window, you will receive an array of all the property updates during this time.

Example Query:

GET 'https://api.OIS.com/thngs/504766a7c81205a0744243c1/properties/year'

Update a Single Property

In the same manner, properties can be updated individually using their individual endpoint.

PUT /thngs/{Thng/D}/properties/{key}

Example Query:

```
PUT
'https://api.OIS.com/thngs/504766a7c8f205a0744243c1/properties/volume' \
-d '[{
"value": "30"
}]'
```

Deleting Individual Properties

Property updates are not individually identified, so the only way to delete data points is to append the ?to =<timestamp> URL query parameter to specify a point in time before which all the data points will be removed.

DELETE /thngs/{ThngID}/properties/{key}[?to =<timestamp>]

Example Query:

DELETE 'https://api.OIS.com/thngs/504766a7c81205a0744243c1/properties/Volume'

Locations

As ADIs may be made to model real-world entities, all thngs preferably also have a special set of properties, called Locations, which model the actual position of the object in space over a time period. The Location document model is as follows:

```
<Location>={
"latitude": <Number>,
"longitude": <Number>,
"timestamp": <timestamp>
}
```

In presently preferred implementations longitude is a float between [−180; 180], while latitude is a float between [−90; 90]

Update the Location

Just like properties, the location of a thng can be updated at any time via the /location endpoint of the thng. The payload must always be an array of Location objects, which allows sending several locations (with different timestamps each) to be sent in one single request. This feature is useful for example when a device wants to update a path over a certain period of time. An example would be a taxi that updates the whole set of locations it has been through over the last hour (instead of sending each GPS sensor reading individually).

```
PUT /thngs/{ThngID}/Location
Content-Type: application/json
Authorization: $OIS_API_KEY
[
{
*"latitude": <Number>,
*"longitude": <Number>,
"timestamp": <timestamp>
},
...
]
```

To cope with the limitations of mobile network providers a user can use both POST and PUT to update the location of a thng.

Example Query:

```
PUT
'https://api.OIS.com/thngs/504766a7c8f205a0744243c1/location' \
    -d '[{
    "latitude": 36,
    "longitude": −17.3
    },{
    "timestamp":1347028945711,
    "latitude": −37,
    "longitude": −179.3
    }]'
```

Note that the first Location object doesn't have a timestamp intentionally, which will be automatically assigned by the engine to the time the request has been processed.

Read the Locations

To access the list of all the location updates for a thng, send a GET to the /location endpoint of the thng.

GET /thngs/{ThngID}/location

Example Query:
GET 'https://api.OIS.com/thngs/504766a7c81205a0744243c1/location'

Deleting Location Updates

Location updates are also not individually identified, so the only way to delete data points is to append the ?to = <timestamp> URL query parameter to specify a point in time before which all the updates will be removed.

DELETE /thngs/{ThngID}/location[?to =<timestamp>]

Example Query:
DELETE 'https://api.OIS.com/thngs/504766a7c81205a0744243c1/location'

Products

Products are similar to thngs, but instead of modeling an individual object instance, products are used to model a class of objects. Products may be used for general classes of thngs, usually a particular model with specific characteristics. Products are useful to capture the properties that are common to a set of thngs.

Creating a New Product

To create a new Product, POST a JSON document that describes a product to the /products endpoint.

The response payload contains the complete Product document and its URL in the Location header. The URL may look like https://api.OIS.com/products/[PROD-IN], where the [PROD-ID] is the unique product identification number. This number can be then stored in the product field of any thng in the engine, which means that the thng is a unique instance of this particular product.

Collections

A collection is a set of thngs that make it easier for users to manage all the thngs they created. Collections have a similar data model to other entities in the engine (a name and description, tags and properties) and are created in a similar manner. Once a collection has been created, users can add or remove manually thngs to that collection, using the /thngs sub-resource of each collection.

Creating a Collection of Thngs

The Collection document model is as follows:

```
<Collection>={
"id": <String>,
"createdAt": <timestamp>,
"updatedAt": <timestamp>,
"name": <String>,
"description": <String>,
"properties": {
<String>: <String>,
... },
"tags": [<String>, ...]
}
```

A user can create a Collection of thngs by POSTing a JSON document to the /collections endpoint.

Get a Single Collection

GET /collections/{CollectionID}

Get all Collections

List an authenticated user's collections of thngs:

GET /collections/

Editing a Collection

To update a collection, PUT the updated JSON document of the collection to its URI.

PUT /collections/{CollectionID}

Example:

```
PUT 'https://api.OIS.com/collections/504787e8c8f205a0744243c9' \
-d '{
"name": "Office-350",
"description": "The collection of all thngs in office 350",
"tags": ["Office","Zurich","350","EVRYTHNG"]
}'
```

Deleting a Collection

Collections can be deleted via sending a DELETE on their URI.

DELETE /collections/{CollectionID}

Example:
DELETE 'https://api.OIS.com/collections/504787e8c81205a0744243c9'

List all Thngs in a Collection

The list of all the thngs in a collection can be retrieved via a GET on the /thugs resource of a collection, as follows:

GET /collections/{CollectionID}/thngs

Example Query:
GET 'https://api.OIS.com/collections/504787e8c81205a0744243c9/thngs'

Adding (Existing) Thngs to a Collection

Thngs can be a collection by PUTing an array with their respective IDs to the /thugs.

PUT /collections/{CollectionID}/thngs

Example Query:

```
PUT 'https://api.OIS.com/collections/4f0d53040b1cdc364a0000001/
   thngs' \-d '["4f0d53040b1cdc364a0098614",
   "44ed3d1ad0b1cdc02490081ca"]'
```

Removing a Thng from a Collection

Thngs can be removed from within a collection, by sending a DELETE to their ID within the {CollectionID}/thngs sub-resource of a collection.

DELETE /collections/{CollectionID}/thngs/{ThngID}

Example Query:

```
DELETE
  'https://api.OIS.com/collections/4f0d53040b1cdc364a000001/thngs/
  504766a7c8f205a0744243c1'
```

Removing all Thngs from a Collection

All thngs within a collection can be removed by sending a DELETE to the

DELETE /collections/{CollectionID}/thngs/

Example Query:

DELETE 'https://api.OIS.com/collections/504766a7c81205a0744243c1/thngs'

SEARCH

The API endpoint /search allows users to search all the thngs, product, collections, etc. in the object information service 112 to which they have access.

Search Modes

A present implementation supports three search modes (although other search modes may be used): (1) searching a string in any field (free-text search); (2) searching only in a subset of the fields available (field search); and (3) searching for entities based on their geographic location (geographic search). In a present exemplary implementation the modes are mutually exclusive (and so cannot be combined within a single request).

1. Free-Text Search:

To search a string over all fields, a user can use the following endpoint:

/search?q=<String>[,<String>]

Find all entities that contain one or more of the strings provided. Results are ordered by relevance, so the first results are those that contain most of the search terms.

Example:

/search?q=sensor,temperature

Searches for all entities that contain any field matching 'sensor' or 'temperature'.

2. Field Search:

A user can also search over the various fields of any entity in the engine (can be collections, thngs, products etc.) by searching for a string in a specific field of the document.

/search?<FieldName>=<String>[,<String>]

Find all entities that contain the given string in their field called FieldName. Several field parameters can be given, and the results are ordered by the entities that contain most of the matching parameters.

Example:

/search?name=tv&description=plasma

Finds all entities that contain the string "tv" in their name field or the string 'plasma' in their description.

3. Geographic Search:

A user can use the geographic search to filter for entities based on their geographic locations (e.g. "give me all guitars within 500 m from my home"), by using the lat, long, maxDist query parameters to specify the search area.

/search?lat=<Float>&lon=<Float>[&maxDist=<Float>]

Search for entities whose location are close to the provided latitude (lat=[−180; 180]) and longitude (lat=[−180; 180]). Optionally, a user can specify the radius for the results using the maxDist=[distance], where distance is the radius in kilometers from the given lat/lon point (by default maximal search radius is 10 Km).

Example:

/search?lat=43.2&lon=−27.1

Searches for all entities within a radius of 10 Km from the GPS coordinate lat=43.2 and longitude=−27.1.

Additional Search Parameters

By default, the search looks over all types of entities in the engine (thngs, products, and collections). A user may limit the entities to be searched to only some specific types using the type=<String>[,<String>], where <String>=[thng|product|collection]. For example, to search only thngs or product that contain the keyword 'Alaska', GET the following URL:

/search?type=thng,product&q=Alaska

Product Recognition Service APIs

The APIs preferably supports a product recognition service on the endpoint /recognize where an application can POST an image, and which returns information available about the product or a barcode (e.g., 1D or 2D) in the image. These product recognition APIs may be accessed, e.g., by object identification service 114 and/or directly by the client. This makes it straightforward to use the system and related services without the need to implement a barcode scanner/decoder in the client application.

Decode a Barcode Image

The APIs preferably provides multiple image recognition endpoints available where a user may POST an image. If the user knows that the image has a 1D or 2D barcode in it, the user can post the image to the /recognize/barcode to speed up the recognition process. If the user knows that the image is a product, then the user should preferably post it to the /recognize/product endpoint. If the user does not know what the image contains, then they should POST it to /recognize/. The returned object has the same model in all cases.

```
POST /recognize/barcode
Content-Type: ---base64---
Authorization: $APP_API_KEY
<Image>
200 OK
Content-Type: application/json
{
    "identifierType":<String>,
    "rawContent":<String>,
    "contentType":<String>,
    "product":{
    "id":<Ref>,
    "name":<String>},
    "thng":{
    "id":<Ref>,
    "name":<String>}
}
```

Return Parameters

| Field | Type | Description |
|---|---|---|
| identifierType | String | Indicates the type of the identification method used and can be: "ean" if the image had an 1D EAN barcode (13 digits), "upc" if the image was a 1D barcode of UPC type, "qr" if the image had a QR code in it, or "image" if the image was simply a photo of the product. |
| rawContent | String | This is the entire raw content of the image recognized. The "identifierType" informs how this content has to be interpreted. |
| contentType | String | Additional information about the content type, for example if it is a vCard, an email, or a phone number. |
| product | String | The is information about the product in the image, such as its product id ("id") within the system, the name of the product ("name"), the default redirection URL associated with the product ("redirection"). If no product was found or linked to the thng (if the product is a QR code), this parameter will be an empty object. |
| Thng | String | The is information about the thng in the image (if available), such as its thng id ("id"), the name of the thng ("name"), the default redirection URL associated with the product ("redirection"). If no product was found or linked to the thng (if the product is a QR code), this parameter will be an empty object. If an image or a 1D barcode identifier was used in the image (therefore no unique identifier image for this thng is available), a new instance of that product will be created on the fly and returned. |

Operation of the System

Figure 3A:
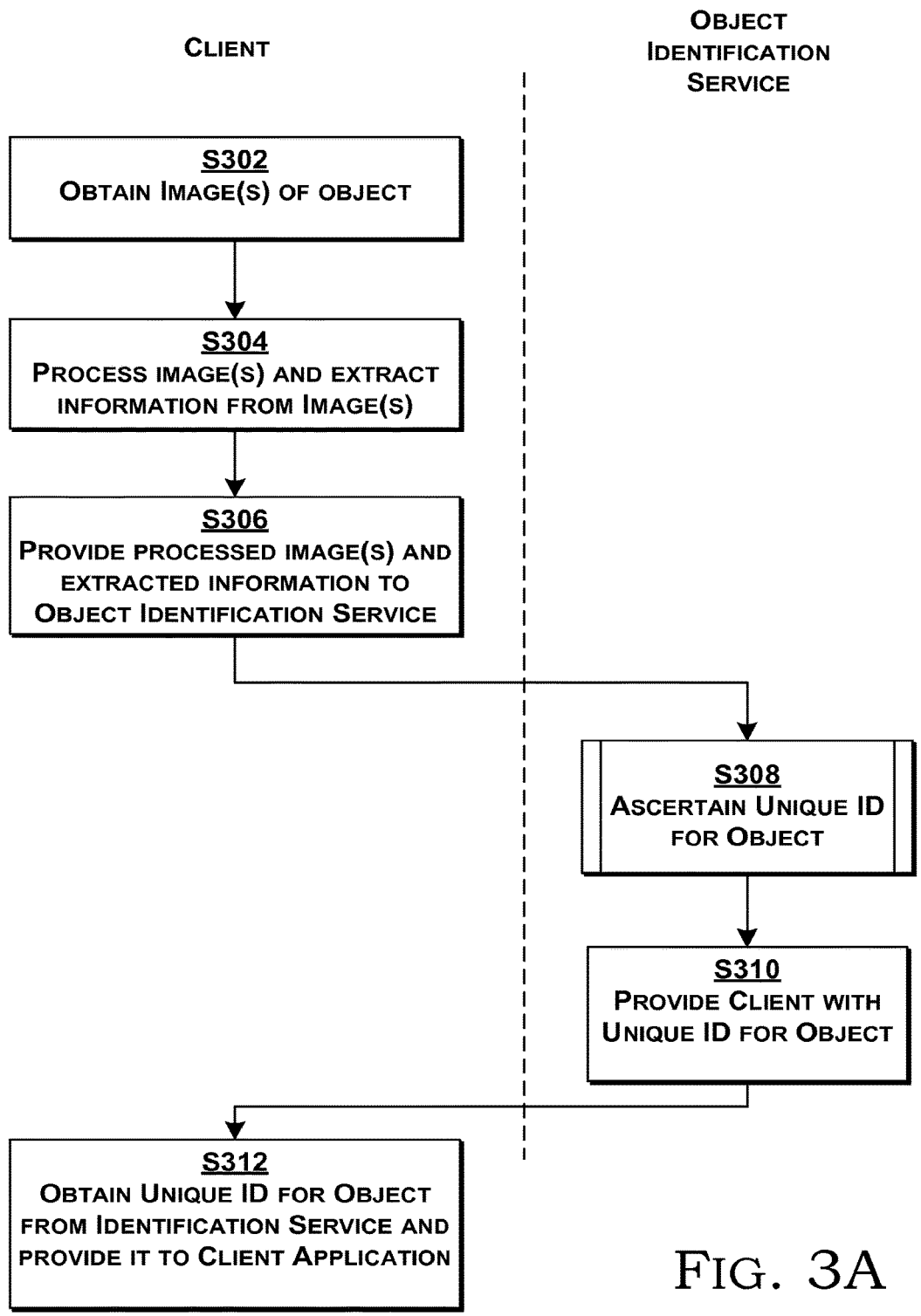
FIGS. 3A-3B are flow diagrams depicting processing according to embodiments hereof.

Exemplary operation of the system 100 (and 100') is described here with reference to the flowchart in FIG. 3A that illustrates a process according to embodiments hereof. As shown in FIG. 3A, the exemplary process includes the following:

1. A client application 106 invokes client module 108.
2. The client module 108 obtains one or more images of an object 104 (at S302). Images may, but need not, include object indicia 110 (or readable or usable object indicia).
3. The client module 108 may perform processing on the captured image(s) on client device in order to extract information from the image (at S304).
4. The client module 108 passes the processed image and possibly some of the extracted information to an online object identification service 114 (at S306).
5. The object identification service 114 then ascertains a unique object identifier for the object 104 (at S308). The object identification service 114 may determine the corresponding unique object identifier (e.g., URI) for an object in the object information service 112, or it may request the object information service 112 to instantiate a new unique object identifier (e.g., URI), and return that unique object identifier (e.g., URI) to the client module 108 (at S310).
6. The client module 108 provides the client application 106 with the unique object identifier (e.g., URI) for the object's profile in the object information service 112 (at S312).

The various processing steps are shown in the drawing separated by a vertical line to indicate where they are being performed (by a client or an object identification service).

Figure 3B:
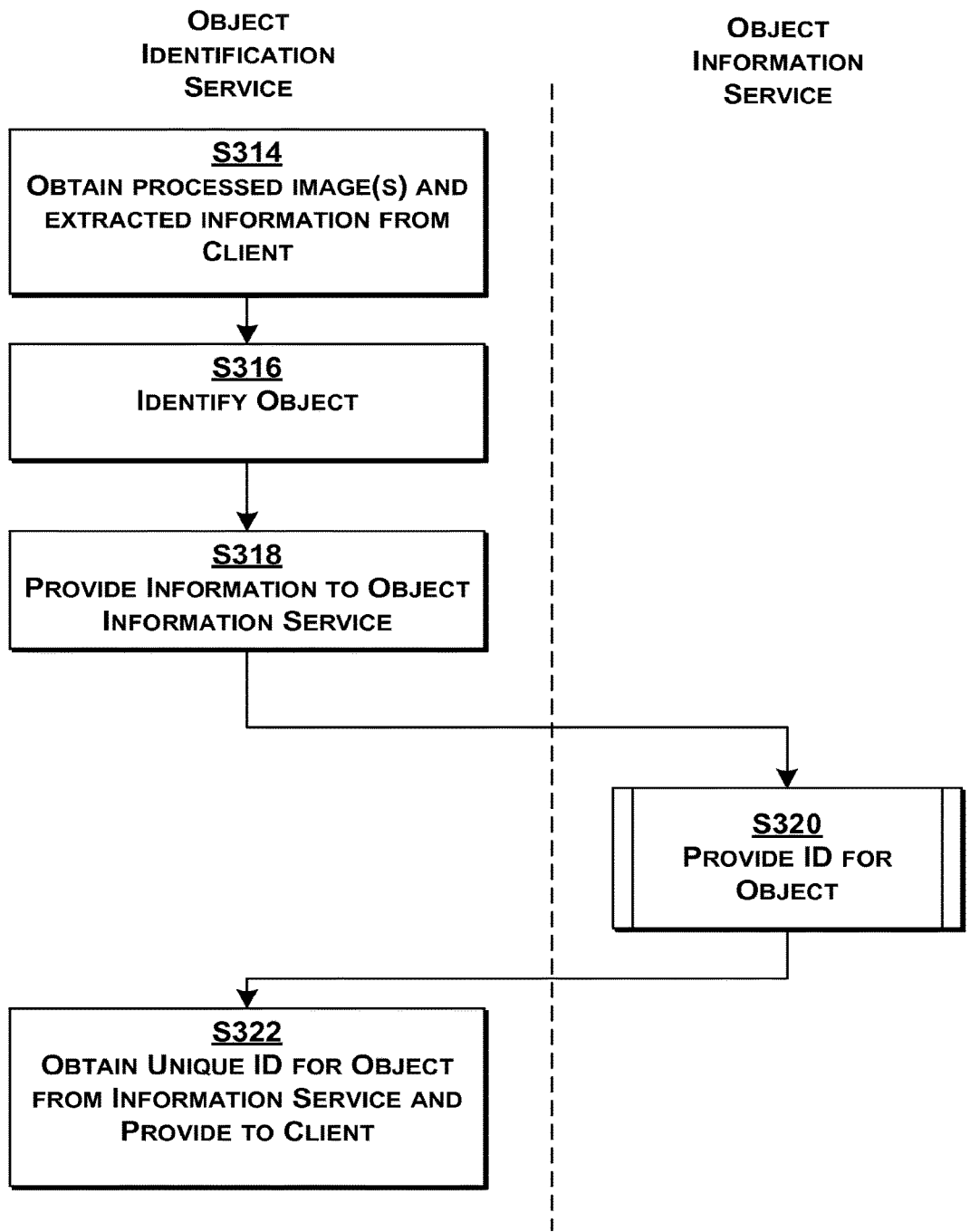

With reference to the flow chart in FIG. 3B, the object identification service 114 obtains the processed images and possibly other information from the client (at S314) and then identifies the object (at S316). If the object identification service 114 knows the unique ID of the object then it may provide that to the client, otherwise it provides information to the object information service 112 (at S318) to create a new object (e.g., using the API interface to "Create a single thng," as described above. Since the device is associated with a particular user, the new object will preferably be associated with that particular user. The object information service 112 provides the object ID to the object identification service 114 (at S320, if needed), and then the object identification service 114 provides the object ID to the client (at S322).

Once it obtains the URI for an object's profile in the object information service 112, the client application may use that URI (or information therein) to interact with the object information service 112 with respect to that object. Preferably the client application uses the URI to address and thereby access the API 120.

As noted, a unique object identifier may be provided as a URI. However, since the client may already know some of the information needed in the URI (e.g., the domain and path), in some cases the object identification service 114 need only provide the identifier to the client. For example, if the client already knows that the object information service 112 (or the APIs 120 associated with the object information service 112) may be accessed at the domain api.evrythng.com, and the <path> is "thngs", and a particular object has the unique identifier "504766a7c8f205a0744243c1" within the object information service 112, then the client need only be provided with the unique identifier in order to form the URI corresponding to that particular object:

https://api.evrythng.com/thngs/504766a7c81205a0744243c1

Those of ordinary skill in the art will realize and appreciate, upon reading this description, that a client module may access and interact with the object identification service 114 in any manner (e.g., via a cellular network, satellite network, or in some other fashion, including combinations of approaches), and the system is not limited by the manner in which such communication or interaction takes place. Similarly, the manner in which a client application interacts with object information service 112 may take place in any manner, and the system is not limited by the manner in which such communication occurs.

EXAMPLES

The following are examples of application of the system disclosed herein. These use cases are provided only as examples and are not intended to be in any way limiting of the invention.

Use Case 1

In this scenario, a user installs an application on his mobile phone. It then launches the application, which runs the client software code described above and takes a photo of a product. The product photo is then sent to an identification server application to be identified. A product SKU (or some such indicia) is found in the image, and a unique product identity for that object for the user is generated on the fly. The user can then attach personalized multimedia content (for example a photo of himself) and he can then invite another friend to view the video.

Use Case 2.

In this scenario, a user buys a bottle of wine that has a UPI tag attached. The user sees an advertisement on a wine review website that prompts him to scan his bottle to take part in a contest. The user clicks on the advertisement, which starts the camera of the device and he can then scan the UPI tag on his bottle. Because the product is verified as genuine and has not yet been used to take part in the contest, the user's participation is validated and the user enters the contest.

COMPUTING

The services, mechanisms, operations and acts shown and described above are implemented, at least in part, by software running on one or more computers or computer systems or user devices. It should be appreciated that each user device is, or comprises, a computer system.

Programs that implement such methods (as well as other types of data) may be stored and transmitted using a variety of media (e.g., computer readable media) in a number of manners. Hard-wired circuitry or custom hardware may be used in place of, or in combination with, some or all of the software instructions that can implement the processes of various embodiments. Thus, various combinations of hardware and software may be used instead of software only.

One of ordinary skill in the art will readily appreciate and understand, upon reading this description, that the various processes described herein may be implemented by, e.g., appropriately programmed general purpose computers, special purpose computers and computing devices. One or more such computers or computing devices may be referred to as a computer system.

Figure 4:
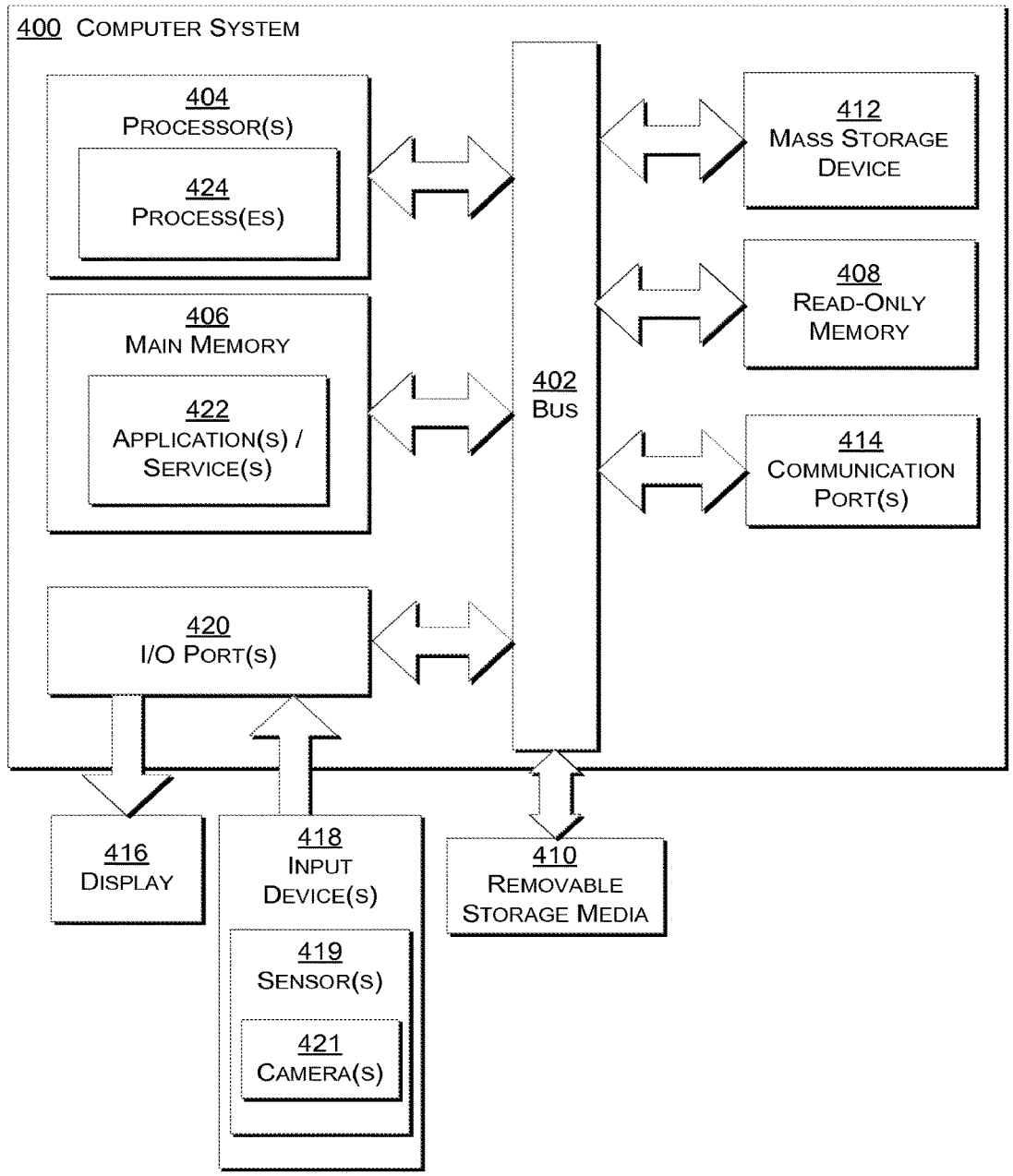
FIG. 4 describes aspects of computing according to embodiments hereof.

FIG. 4 is a schematic diagram of a computer system 400 upon which embodiments of the present disclosure may be implemented and carried out.

According to the present example, the computer system 400 includes a bus 402 (i.e., interconnect), one or more processors 404, one or more communications ports 414, a main memory 406, optional removable storage media 410, read-only memory 408, and a mass storage 412. Communication port(s) 414 may be connected to one or more networks (e.g., computer networks, cellular networks, etc.) by way of which the computer system 400 may receive and/or transmit data.

As used herein, a "processor" means one or more microprocessors, central processing units (CPUs), computing devices, microcontrollers, digital signal processors, or like devices or any combination thereof, regardless of their architecture. An apparatus that performs a process can include, e.g., a processor and those devices such as input devices and output devices that are appropriate to perform the process.

Processor(s) 404 can be (or include) any known processor, such as, but not limited to, an Intel® Itanium® or Itanium 2® processor(s), AMD® Opteron® or Athlon MP® processor(s), or Motorola® lines of processors, and the like. Communications port(s) 414 can be any of an RS-232 port for use with a modem based dial-up connection, a 10/100 Ethernet port, a Gigabit port using copper or fiber, or a USB port, and the like. Communications port(s) 414 may be chosen depending on a network such as a Local Area Network (LAN), a Wide Area Network (WAN), a Content Delivery Network (CDN), or any network to which the computer system 400 connects. The computer system 400 may be in communication with peripheral devices (e.g., display screen 416, input device(s) 418) via Input/Output (I/O) port 420. Some or all of the peripheral devices may be integrated into the computer system 400, and the input device(s) 418 may be integrated into the display screen 416 (e.g., in the case of a touch screen). The input device(s) 418 may include one or more sensors 419 that may comprise one or more image sensors (or cameras) 421.

Main memory 406 can be Random Access Memory (RAM), or any other dynamic storage device(s) commonly known in the art. Read-only memory 408 can be any static storage device(s) such as Programmable Read-Only Memory (PROM) chips for storing static information such as instructions for processor(s) 404. Mass storage 412 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices may be used.

Bus 402 communicatively couples processor(s) 404 with the other memory, storage and communications blocks. Bus 402 can be a PCI/PCI-X, SCSI, a Universal Serial Bus (USB) based system bus (or other) depending on the storage devices used, and the like. Removable storage media 410 can be any kind of external hard-drives, floppy drives, Compact Disc-Read Only Memory (CD-ROM), Compact Disc-Re-Writable (CD-RW), Digital Versatile Disk-Read Only Memory (DVD-ROM), etc.

Embodiments herein may be provided as one or more computer program products, which may include a machine-readable medium having stored thereon instructions, which may be used to program a computer (or other electronic devices) to perform a process. As used herein, the term "machine-readable medium" refers to any medium, a plurality of the same, or a combination of different media, which participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory, which typically constitutes the main memory of the computer. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications.

The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols; and/or (iv) encrypted in any of a variety of ways well known in the art.

A computer-readable medium can store (in any appropriate format) those program elements that are appropriate to perform the methods.

As shown, main memory 406 is encoded with application(s) 422 that support(s) the functionality as discussed herein (an application 422 may be an application that provides some or all of the functionality of one or more of the mechanisms described herein). Application(s) 422 (and/or other resources as described herein) can be embodied as software code such as data and/or logic instructions (e.g., code stored in the memory or on another computer readable medium such as a disk) that supports processing functionality according to different embodiments described herein.

During operation of one embodiment, processor(s) 404 accesses main memory 406, e.g., via the use of bus 402 in order to launch, run, execute, interpret or otherwise perform the logic instructions of the application(s) 422. Execution of application(s) 422 produces processing functionality of the service(s) or mechanism(s) related to the application(s). In other words, the process(es) 424 represents one or more portions of the application(s) 422 performing within or upon the processor(s) 404 in the computer system 400.

It should be noted that, in addition to the process(es) 424 that carries (carry) out operations as discussed herein, other embodiments herein include the application 422 itself (i.e., the un-executed or non-performing logic instructions and/or data). The application 422 may be stored on a computer readable medium (e.g., a repository) such as a disk or in an optical medium. According to other embodiments, the application 422 can also be stored in a memory type system such as in firmware, read only memory (ROM), or, as in this example, as executable code within the main memory 406 (e.g., within Random Access Memory or RAM). For example, application 422 may also be stored in removable storage media 410, read-only memory 408, and/or mass storage device 412.

Those skilled in the art will understand that the computer system 400 can include other processes and/or software and hardware components, such as an operating system that controls allocation and use of hardware resources.

As discussed herein, embodiments of the present invention include various steps or operations. A variety of these steps may be performed by hardware components or may be embodied in machine-executable instructions, which may be used to cause a general-purpose or special-purpose processor programmed with the instructions to perform the operations. Alternatively, the steps may be performed by a combination of hardware, software, and/or firmware. The term "module" refers to a self-contained functional component, which can include hardware, software, firmware or any combination thereof.

One of ordinary skill in the art will readily appreciate and understand, upon reading this description, that embodiments of an apparatus may include a computer/computing device operable to perform some (but not necessarily all) of the described process.

Embodiments of a computer-readable medium storing a program or data structure include a computer-readable medium storing a program that, when executed, can cause a processor to perform some (but not necessarily all) of the described process.

Where a process is described herein, those of ordinary skill in the art will appreciate that the process may operate without any user intervention. In another embodiment, the process includes some human intervention (e.g., a step is performed by or with the assistance of a human).

Thus is described a mechanism for an application on a client device (smartphone, tablet computer or similar device) to interact with an object (product or other object) to obtain an identifier credential and using this credential connect with an online information profile associated with that specific physical object.

Aspects of the system may be used by the application to deliver functions or services informed by information from or about the physical object it is interacting with and obtained by the application from the object's online profile, or for information about the physical object collected by the application to be passed to the object's online profile for access by third parties.

As used in this description, the term "portion" means some or all. So, for example, "A portion of X" may include some of "X" or all of "X". In the context of a conversation, the term "portion" means some or all of the conversation.

As used herein, including in the claims, the phrase "at least some" means "one or more," and includes the case of only one. Thus, e.g., the phrase "at least some ABCs" means "one or more ABCs", and includes the case of only one ABC.

As used herein, including in the claims, the phrase "based on" means "based in part on" or "based, at least in part, on," and is not exclusive. Thus, e.g., the phrase "based on factor X" means "based in part on factor X" or "based, at least in part, on factor X." Unless specifically stated by use of the word "only", the phrase "based on X" does not mean "based only on X."

As used herein, including in the claims, the phrase "using" means "using at least," and is not exclusive. Thus, e.g., the phrase "using X" means "using at least X." Unless specifically stated by use of the word "only", the phrase "using X" does not mean "using only X."

In general, as used herein, including in the claims, unless the word "only" is specifically used in a phrase, it should not be read into that phrase.

As used herein, including in the claims, the phrase "distinct" means "at least partially distinct." Unless specifically stated, distinct does not mean fully distinct. Thus, e.g., the phrase, "X is distinct from Y" means that "X is at least partially distinct from Y," and does not mean that "X is fully distinct from Y." Thus, as used herein, including in the claims, the phrase "X is distinct from Y" means that X differs from Y in at least some way.

As used herein, including in the claims, a list may include only one item, and, unless otherwise stated, a list of multiple items need not be ordered in any particular manner. A list may include duplicate items. For example, as used herein, the phrase "a list of XYZs" may include one or more "XYZs".

It should be appreciated that the words "first" and "second" in the description and claims are used to distinguish or identify, and not to show a serial or numerical limitation. Similarly, the use of letter or numerical labels (such as "(a)", "(b)", and the like) are used to help distinguish and/or identify, and not to show any serial or numerical limitation or ordering.

No ordering is implied by any of the labeled boxes in any of the flow diagrams unless specifically shown and stated. When disconnected boxes are shown in a diagram the activities associated with those boxes may be performed in any order, including fully or partially in parallel.

While the invention has been described in connection with what is presently considered to be the most practical and preferred embodiments, it is to be understood that the invention is not to be limited to the disclosed embodiment, but on the contrary, is intended to cover various modifications and equivalent arrangements included within the spirit and scope of the appended claims.

What is claimed:

1. A computer-implemented method, implemented by hardware in combination with software, operable on an object information service, said object information service comprising: (i) an object database, (ii) object information applications for maintaining and accessing information in said object database, and (iii) an Application Programming Interface (API) to said object information applications, said API being externally accessible, wherein said object database maintains a persistent profile for each of a plurality of objects,
the method comprising:
(a) obtaining, at a device, information about an object;
(b) determining an identifier for the object from the information obtained in (a) by:
(b)(1) providing at least some of said information to an identification mechanism; and
(b)(2) obtaining an identifier for the object from an identification mechanism; and then
(c) using the identifier and said API to add said object to said object information service, wherein the information service maintains a persistent online profile for the object in said object database, said profile being accessible at the information service using the identifier, and wherein the identifier for the object is unique within the information service; and then,
(d) using the identifier and said API to access and store data about the object at said object information service.

2. The method of claim 1 wherein said determining in (b) comprises:
(b)(1) determining said identifier at said device.

3. The method as in claim 1 wherein the obtaining in (a) comprises:
(a)(1) obtaining at least one image of the object.

4. The method of claim 1 where said object comprises indicia and where said identifier is determined from said indicia.

5. The method of claim 4 wherein said indicia comprise at least one bar code.

6. The method of claim 4 wherein said indicia encode at least part of the identifier.

7. The method of claim 4 wherein the indicia comprise at least some of a Uniform Resource Identifier (URI).

8. The method of claim 1 wherein said information about the object is determined by said device from said at least one image of the object.

9. The method of claim 8 wherein, said act (c) uses the identifier to access the at least one of said object information applications via the API.

10. The method of claim 1 wherein the identification mechanism identifies the object based on the information about the object provided in (b)(1).

11. The method of claim 10 wherein the identification mechanism provides information about an identity of the object to the information service.

12. The method of claim 11 wherein the information mechanism creates a new identifier for the object in response to receipt of information from the identification mechanism.

13. The method of claim 11 wherein the information mechanism provides a previously created identifier for the object in response to receipt of information from the identification mechanism.

14. The method of claim 1 wherein a user is associated with the device, and wherein the user is associated with the object within the object information service via the identifier.

15. The method of claim 1 wherein the identifier comprises a Uniform Resource Identifier (URI) that is resolvable to the object information service.

16. The method of claim 15 wherein the URI comprises a hostname and wherein the hostname is resolvable to the object information service.

17. The method of claim 1 wherein the object information service comprises rules relating to object access, and wherein the information service provides access to information about the object in accordance with the rules.

18. The method of claim 17 wherein the rules comprise relate to at least one access policy.

19. The method of claim 1 wherein the identifier for the object is determined independent on any indicia on the object.

20. The method of claim 1 wherein the identifier is based on the object and a user identity to uniquely identify the object within the object information service.

21. The method of claim 1 wherein information about the object in the object database is keyed on at least some of the identifier.

22. The method of claim 1 wherein using the identifier in (c) comprises at least one of using the identifier to:
update data about the object in the object database;
delete data about the object from the object database;
update at least one property of the object in the object database;
retrieve a list of properties of the object from the object database; and
delete at least one property of the object in the object database.

23. The method of claim 22 wherein using the identifier in (c) comprises at least one of using the identifier to:
read data about the object from the object database; and
retrieve a property of the object from the object database.

24. The method of claim 1 wherein the object is an item selected from: physical items, virtual items, locations, events, things, persons, places, and images.

25. The method of claim 1 wherein using the identifier in (c) comprises at least one of using the identifier to:
update data about the object, wherein the data being updated includes location data of the object.

26. The method of claim 1 wherein information about the object in the object database is keyed on the identifier.

* * * * *